United States Patent
Liu et al.

(10) Patent No.: US 11,755,272 B2
(45) Date of Patent: Sep. 12, 2023

(54) METHOD AND SYSTEM FOR USING ENHANCEMENT TECHNIQUES TO IMPROVE REMOTE DISPLAY WHILE REDUCING HARDWARE CONSUMPTION AT A REMOTE DESKTOP

(71) Applicant: VMware, Inc., Palo Alto, CA (US)

(72) Inventors: Yang Liu, Beijing (CN); Lin Lv, Beijing (CN); Jingxiao Xu, Beijing (CN); Yanchao Zhang, Beijing (CN); Le Yu, Beijing (CN); Qimin Yao, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/643,815

(22) Filed: Dec. 10, 2021

(65) Prior Publication Data
US 2023/0185512 A1 Jun. 15, 2023

(51) Int. Cl.
*G06F 3/14* (2006.01)
*G06T 1/20* (2006.01)
*G06T 3/40* (2006.01)

(52) U.S. Cl.
CPC .......... *G06F 3/1454* (2013.01); *G06F 3/1415* (2013.01); *G06F 3/1438* (2013.01);
(Continued)

(58) Field of Classification Search
CPC .... G06F 3/1454; G06F 3/1415; G06F 3/1438; G06F 3/1462; G06F 9/45545; G06F 9/452; G06T 1/20; G06T 3/4007
See application file for complete search history.

(56) References Cited

U.S. PATENT DOCUMENTS

| | | | |
|---|---|---|---|
| 7,602,388 B2 | 10/2009 | Plut | |
| 8,527,654 B2 | 9/2013 | Vonog et al. | |

(Continued)

FOREIGN PATENT DOCUMENTS

| | | |
|---|---|---|
| WO | 2008014288 A2 | 1/2008 |
| WO | 2011060442 A2 | 5/2011 |

OTHER PUBLICATIONS

"Anti-aliasing." Wikipedia, Dec. 10, 2021, en.wikipedia.org/wiki/Anti-aliasing.

(Continued)

*Primary Examiner* — Vijay Shankar
(74) *Attorney, Agent, or Firm* — Patterson + Sheridan, LLP

(57) ABSTRACT

The disclosure provides a method for optimizing remote display at a client device in communication with a remote desktop. The method generally includes receiving one or more frames for display at the client device, determining that a frame rate of the received one or more frames is less than an expected frame rate and/or a resolution of the received one or more frames is less than an expected resolution, determining that at least one of a local central processing unit (CPU) usage at the client device is less than a CPU usage threshold or a local graphics processing unit (GPU) usage at the client device is less than a GPU usage threshold, applying one or more enhancement techniques to the received one or more frames to produce one or more optimized frames while continuously monitoring the local CPU usage and/or the local GPU usage at the client device, and rendering the one or more optimized frames for display at the client device.

20 Claims, 6 Drawing Sheets

(52) U.S. Cl.
CPC .............. *G06F 3/1462* (2013.01); *G06T 1/20* (2013.01); *G06T 3/4007* (2013.01)

(56) References Cited

U.S. PATENT DOCUMENTS

| | | | |
|---|---|---|---|
| 8,606,966 | B2 | 12/2013 | Panigrahi et al. |
| 9,473,355 | B2* | 10/2016 | Stickle ................ G06F 11/3003 |
| 9,694,281 | B2* | 7/2017 | Garden .............. H04N 21/2393 |
| 10,044,576 | B2* | 8/2018 | Arulesan ............. G06F 11/3062 |
| 2008/0100598 | A1 | 5/2008 | Juenger |
| 2009/0147853 | A1 | 6/2009 | Gokce et al. |
| 2009/0219379 | A1 | 9/2009 | Rossato et al. |
| 2010/0226435 | A1 | 9/2010 | Riemens et al. |
| 2011/0032999 | A1 | 2/2011 | Chen et al. |
| 2013/0219012 | A1 | 8/2013 | Suresh et al. |
| 2014/0226901 | A1 | 8/2014 | Spracklen et al. |
| 2014/0280873 | A1* | 9/2014 | Stickle .................... H04L 43/04 709/224 |
| 2015/0375112 | A1* | 12/2015 | Garden .............. H04N 21/2405 463/31 |
| 2016/0142769 | A1 | 5/2016 | Spracklen et al. |
| 2017/0149633 | A1* | 5/2017 | Arulesan ............. G06F 11/3062 |

OTHER PUBLICATIONS

"Deep learning super sampling", Wikipedia, Dec. 10, 2021, en.wikipedia.org/wiki/Deep_learning_super_sampling.

Deep Learning Super Sampling (DLSS) Technology on NVIDIA, Dec. 10, 2021, https://www.nvidia.com/enus/geforce/technologies/dlss/.

Xia, Min et al., Detecting video frame rate up-conversion based on frame-level analysis of average texture variation, Multimedia Tools and Applications, vol. 76, No. 6, Mar. 15, 2017, 25 pages.

Xue, Tianfan et al., Video Enhancement with Task-Oriented Flow, International Journal of Computer Vision, Nov. 10, 2019, pp. 1-20.

* cited by examiner

User Interface Configuration

☐ Enable Frame Interpolation and Resolution Upscaling on Client

Expected FPS (Frames per second):

Expected Resolution (width x height):

Local CPU Usage Threshold (%):

Local GPU Usage Threshold (%):

OK    Cancel

FIG. 4

METHOD AND SYSTEM FOR USING ENHANCEMENT TECHNIQUES TO IMPROVE REMOTE DISPLAY WHILE REDUCING HARDWARE CONSUMPTION AT A REMOTE DESKTOP

BACKGROUND

Virtual desktop infrastructure (VDI) is a desktop virtualization technology wherein virtual images of a desktop, running on a host in a remote data center, are delivered over a network to a client device (e.g., a personal computer (PC) or mobile device), using a remote display protocol, for display remotely at the client device. In particular, images of the remote desktop OS, or its applications, are captured and sent (e.g., as a stream of pixels) to the client device which allows a user of the client device to interact with the remote desktop OS, and its applications, as if they were running locally. The user may interact with the remote desktop using peripheral devices (e.g., a keyboard and/or a mouse) associated with the client device. Inputs by the user at the client device, using such peripheral devices, are captured by a VDI client (e.g., a user-side interface of the remote desktop) of the client device and redirected from the client device to a VDI agent of the remote desktop.

In some cases, multiple users may simultaneously connect and/or interact with one or more remote desktops that share the same hardware resources (e.g., of one or more hosts). For example, hardware resources (e.g., central processing unit (CPU), memory, graphics processing unit (GPU), and the like) of a host where multiple remote desktops are running may be shared among the multiple users. Accordingly, when a user connects to a lightly-loaded host (e.g., a host with few users connected to remote desktops running on the host), the user experience may be satisfactory. For example, the user experience may be similar to using a locally-executing remote desktop given resources available at the host for use by the user are plentiful. However, where multiple users are connected to a host and/or hardware resources of a host running a remote desktop are limited, such user experience may be suboptimal. In particular, to accommodate each of the connected users, a hypervisor of the host may be forced to make tradeoffs with respect to resources allocated to each of the remote desktops of the connected users. For example, a VDI agent associated with a particular remote desktop may need to reduce a display frame rate and/or decrease resolution of data transmitted to a client device based on the reduced availability of resources. While these resource usage reducing techniques may be used by the VDI agent to ensure the remoting solution conforms to the available resource limitations, while also accommodating all connected users, such techniques degrade the user experience. For example, images displayed at a client device of a user with a low frame display frame rate and/or decreased resolution may appear fuzzy and/or result in jerky animations or video thereby impacting the viewing experience of the image, animation, or video.

Further, network bandwidth between a host running a remote desktop and a client device may be limited, such as due to instability of a network or usage of the network. Network bandwidth refers to the volume of information that can be sent over a connection between the host running the remote desktop and the client device in a measured amount of time. Thus, in some cases, the VDI agent of the remote desktop may similarly reduce a display frame rate and/or decrease resolution of data transmitted to a client device based on the available network bandwidth limitation. Thus, the availability of resources, such as network resources and/or hardware resources, associated with a remote desktop may affect a display frame rate and/or resolution of data transmitted to a client device.

Accordingly, there is a need in the art for improved remote display techniques to improve remote user experience in a VDI environment, while also reducing hardware resource consumption and/or network bandwidth usage required for such remote display.

BRIEF DESCRIPTION OF THE DRAWINGS

FIG. 4 depicts an example user interface (UI) for configuring frame interpolation and resolution upscaling on a client device, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
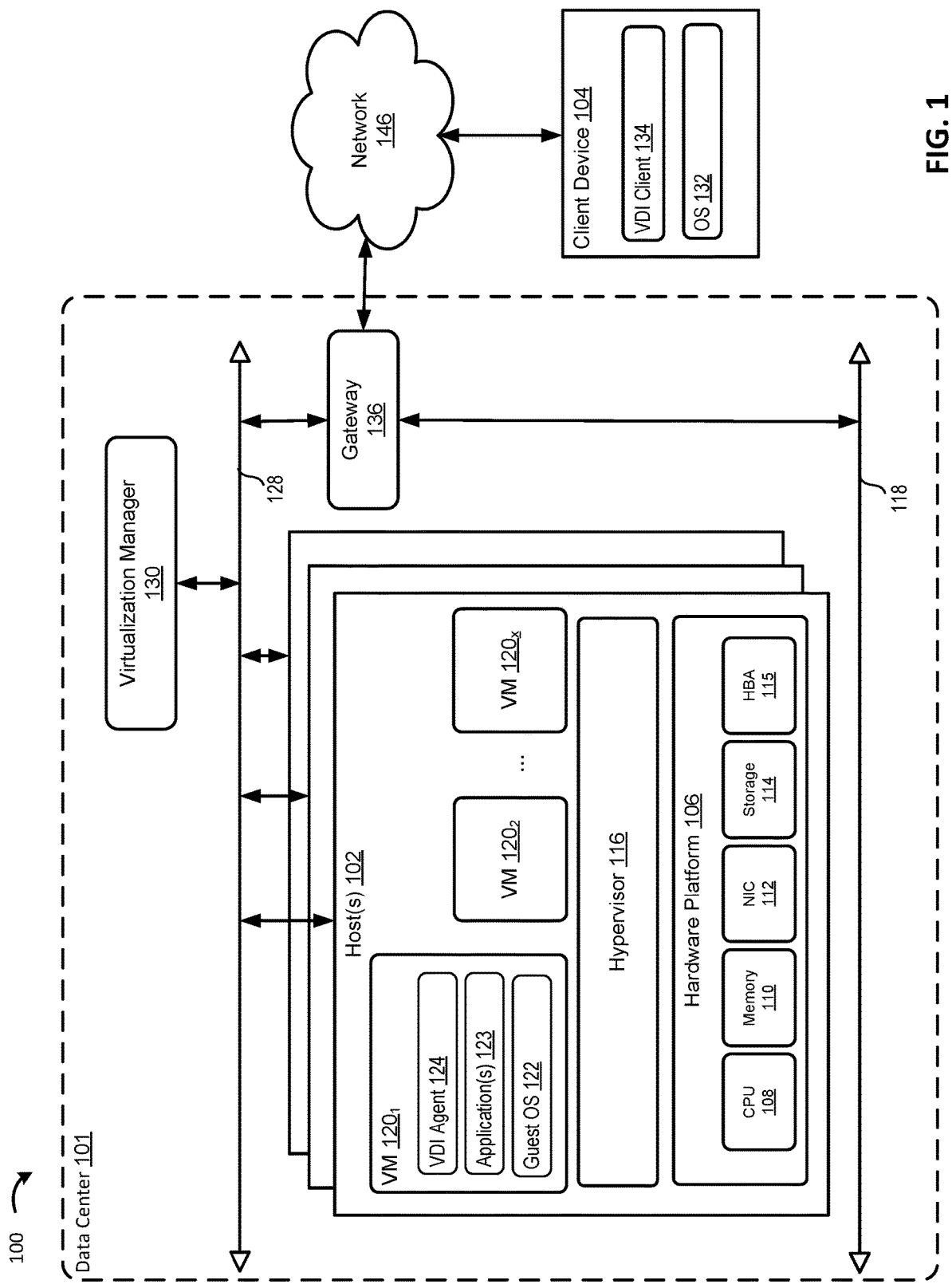
FIG. 1 depicts a block diagram of a virtualized desktop infrastructure system in which one or more embodiments of the present disclosure may be implemented.

The present disclosure provides an approach for enhancing the experience of a user of a remote client device interacting with a remote desktop while reducing hardware resource consumption at a host where the remote desktop is running. In particular, certain aspects of the present disclosure provide an approach for using local computing capability of the client device to adaptively apply one or more image enhancing techniques to improve remote display at the client device.

As mentioned, during operation, images of the remote desktop are captured and sent (e.g., as a stream of pixels, or frames), to a client device which allows a user of the client device to interact with the remote desktop, and its applications, as if they were running locally. Frames of the remote desktop are transmitted to the client device at a certain frame rate (e.g., measured in frames per second (FPS)), and with a particular resolution, using a remote display protocol. The maximum frame rate limit that the remote display protocol can deliver to the remote session client device may be preconfigured; however, this limit does not set the actual frame rate for the remote session. Further, a maximum resolution that the remote display protocol can deliver to the remote session client device may be preconfigured, as well, however, this preconfigured value does not set the actual resolution of images for the remote session. The actual frame rate and/or resolution of images displayed in the remote session depends on other factors such as application and computer hardware resource availability of a host or data center hosting the remote desktop.

In particular, reduced frame rates and/or low resolution of frames transmitted to the client device may be caused by client device settings that create a larger workload than hardware resources at the remote desktop, meaning hardware resources at the host running the remote desktop, can handle. In other words, where hardware resources at the remote desktop are limited, a display frame rate of data transmitted to the client device may be reduced. Further, where resolution configured for the client device is high (e.g., increased number of pixels per image), more resources (e.g., more graphics processing unit (GPU) resources) at the remote desktop may be required to generate each frame. Thus, again, where hardware resources are limited, a resolution of data transmitted to the client device may be reduced.

The frame rate is the frequency in which a consecutive series of frames appear on a display at the client device; thus, where the frame rate is low, fewer frames, or still images, are captured per second, which results in poor viewing experience by a user of the client device. Accordingly, to improve remote display at the client device where the FPS and/or graphic quality is limited, certain aspects described herein provide techniques for frame interpolation and/or image upscaling using hardware resources at the client device.

Frame interpolation is a statistical method in which intermediate frames are generated between existing frames by means of interpolation, in an attempt to make animation more fluid, to compensate for display motion blur, and the like. In particular, in a sequence of frame updates received at the client device, frame interpolation techniques may be used to predict and insert frames in the frame sequence received at the client device to make remote display more smooth when the FPS of the remote display is limited (e.g., due to limited hardware resources). On the other hand, image upscaling refers to the magnification of digital material. Image upscaling may also be referred to as resolution enhancement which is a process used to convert low resolution images into high resolution images. In other words, image upscaling techniques, or resolution enhancement techniques, may be used to generate high resolution frames based on received low resolution frames received from the remote desktop. Frame interpolation and image upscaling techniques may be described in more detail below with respect to FIG. 3.

According to certain aspects, the client device, through, for example, a virtual desktop infrastructure (VDI) client (e.g., a user-side interface of the remote desktop), may determine whether it is necessary to apply enhancement techniques, such as frame interpolation and/or image upscaling techniques, to frames received from the remote desktop based on network conditions, local central processing unit (CPU) usage, and/or local GPU usage. For example, when display quality, e.g., FPS and/or resolution, of images presented at the client device is below an expected quality (e.g., below a desired FPS and/or desired resolution at the client device) due to limited hardware resources at the remote desktop host and/or an unstable network, the VDI client may determine application of enhancement techniques for improving display quality is warranted given computing capability at the client is sufficient to apply such techniques. In turn, use of local computing capability at the client device may allow for reduced hardware and/or network bandwidth consumption, which in some cases where the network is poor, may allow for the network to recover and, therefore, increase its frame rate of frames delivered.

Notably, techniques described herein provide mechanisms by which capabilities of client devices are leveraged to improve remote display at client devices under poor network conditions. In particular, resources at client devices may be used to locally increase the FPS of frames received from the remote desktop using motion estimation and motion compensation (MEMC) frame interpolation, locally generate high-resolution display frames based on low-resolution frames received from the remote desktop, or any combination thereof for purposes of improving remote display to enhance remote user experience on a remoting client device.

FIG. 1 depicts a block diagram of a virtualized desktop infrastructure (VDI) system 100 in which one or more embodiments of the present disclosure may be implemented. VDI system 100 comprises a client device 104 and a data center 101, connected by a network 146. Network 146 may be, for example, a direct link, a local area network (LAN), a wide area network (WAN) such as the Internet, another type of network, or any combination thereof.

Client device 104 is a physical device, such as a general purpose desktop computer or mobile computer. A mobile computer may be, for example, a laptop, a mobile phone, or a tablet computer. Client device 104 includes VDI client 134 and operating system (OS) 132. In certain embodiments, VDI client 134 runs on top of OS 132. OS 132 may be a standard, commodity operating system.

VDI client 134 is a user-side interface of a virtualized desktop running on one of virtual machines (VMs) 120. As used herein, a "virtualized desktop" or "remote desktop" is a desktop running on one of VMs 120 that is displayed remotely on client device 104, as though the remote desktop were running on client device 104. By opening VDI client 134, a user of client device 104 accesses, through network 146, a remote desktop running in remote data center 101, from any location, using client device 104. Frames of the remote desktop running on VM 120 are transmitted to VDI client 134 at a certain frame rate using a remote display protocol such as VMware® Blast™, or Microsoft® Remote Desktop Protocol (RDP)™. In some embodiments, the frame rate (e.g., frames per second (FPS)) at which frames of the remote desktop are transmitted to VDI client 134 is determined based on application and computer hardware resource availability of data center 101 (e.g., host 102) hosting the remote desktop. For example, the frame rate may be reduced where remote workloads exceed available resources of data center 101. As described in more detail below, in cases where the measured FPS is below an expected threshold at the client device, VDI client 134 may be configured to determine whether current CPU and/or GPU usage at the client device is lower than a CPU usage threshold (also referred to herein as a local CPU usage threshold) and/or a GPU usage threshold (also referred to herein as a local GPU usage threshold) for purposes of increasing display quality, e.g., FPS and/or resolution, at the client device for optimal user experience.

After transmission, the frames are displayed on client device 104 for interaction by a user. Client device 104 sends user inputs to VM 120 for processing on VM 120 of data center 101, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others. As the user interacts with the virtual desktop, such as using a mouse and keyboard, the user input is redirected by VDI client 134 to VDI agent 124.

Data center 101 includes host(s) 102, a virtualization manager 130, a gateway 136, a management network 128, and a data network 118. Although the management and data network are shown as separate physical networks, in some implementations the management network is logically isolated from the data network using different VLAN identifiers. Each of hosts 102 may be constructed on a server grade hardware platform 106, such as an x86 architecture platform. For example, hosts 102 may be geographically co-located servers on the same rack.

Host 102 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host 102. Hypervisor 116 may run on top of the OS in host 102. In some embodiments, hypervisor 116 can be installed as system level software directly on hardware platform 106 of host 102 (often referred to as "bare metal" installation) and be conceptually interposed between the physical hardware and the guest OSs executing in VMs 120. In some implementations, hypervisor 116 may comprise system level software as well as a "Domain 0" or "Root Partition" VM, which is a privileged machine that has access to the physical hardware resources of host 102. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 116 that may be used is a VMware ESXi™ hypervisor provided as part of the VMware vSphere® solution made commercially available from VMware, Inc. of Palo Alto, Calif.

Each VM 120 includes a guest OS 122, one or more applications 123 and a VDI agent 124. Application(s) 123 and VDI agent 124 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Hardware platform 106 of each host 102 includes components of a computing device such as one or more processors (CPUs) 108, memory 110, a network interface card including one or more network adapters, also referred to as Network Interface Cards (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 102 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 102 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 102 via a network, shown as management network 128, and carries out administrative tasks for data center 101 such as managing hosts 102, managing VMs 120 running within each host 102, provisioning VMs, migrating VMs from one host to another host, and load balancing between hosts 102. Virtualization manager 130 may be a computer program that resides and executes in a central server in data center 101 or, alternatively, virtualization manager 130 may run as a virtual appliance (e.g., a VM 120) in one of hosts 102. One example of a virtualization manager is the vCenter Server™ product made available from VMware, Inc. of Palo Alto, Calif.

Gateway 136 provides VMs 120 and other components in data center 101 with connectivity to network 146. Gateway 136 may manage external public internet protocol (IP) addresses for VMs 120, route traffic incoming to and outgoing from data center 101, and provide networking services, such as firewalls, network address translation (NAT), dynamic host configuration protocol (DHCP), and load balancing. Gateway 136 uses data network 118 to transmit data network packets to hosts 102. Gateway 136 may be a VCI, a physical device, or a software module running within host 102. Gateway 136 may include two gateways: a management gateway for management network 128 and a data gateway for data network 118.

Figure 2:
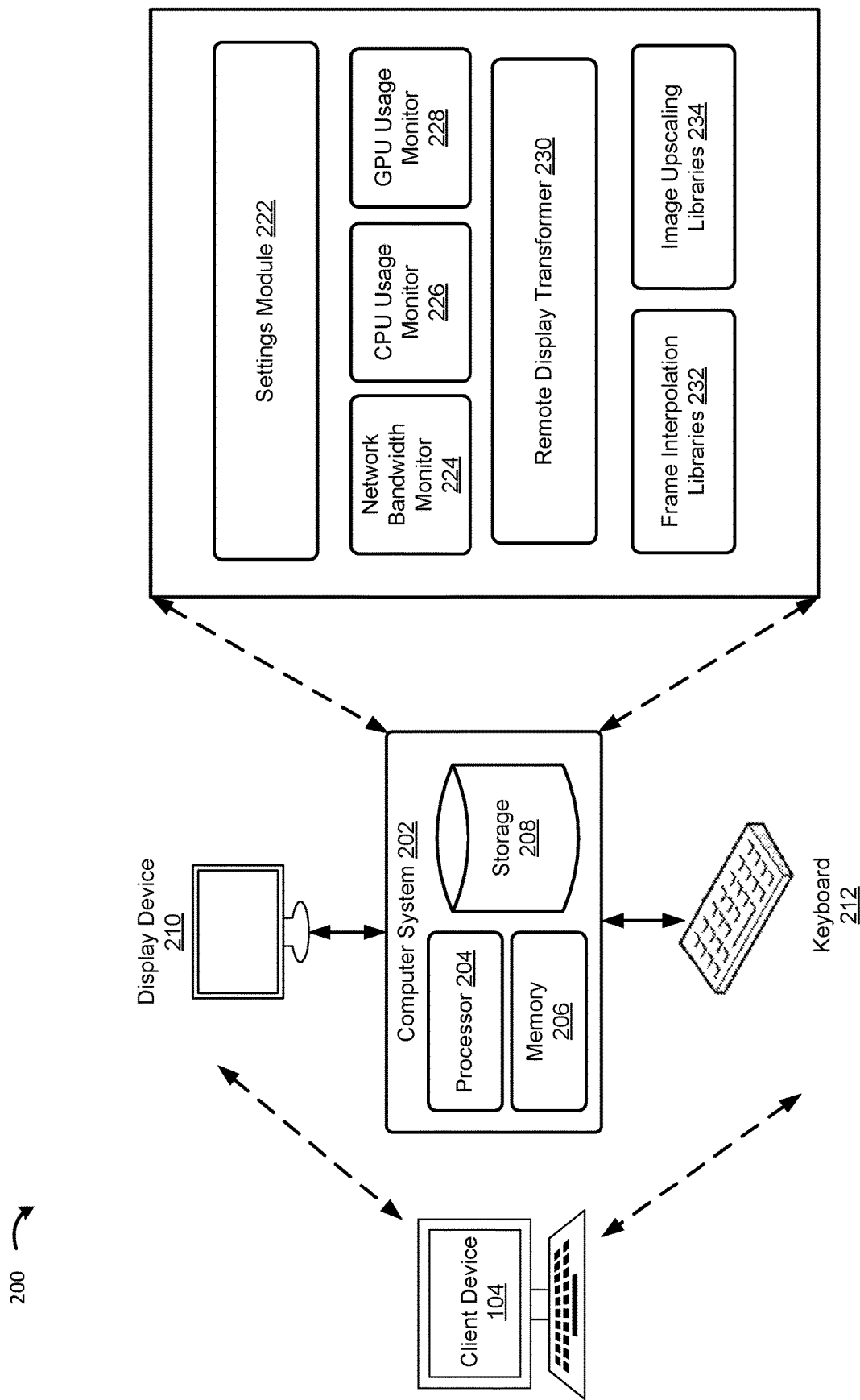
FIG. 2 illustrates an exemplary client device configured for enhancing remote display using local computing capability, according to an example embodiment of the present disclosure.

FIG. 2 illustrates an exemplary client device, such as client device 104 illustrated in FIG. 1, configured for enhancing remote display using local computing capability, according to an example embodiment of the present disclosure. In the non-limiting illustrative example of FIG. 2, client device 104 includes a computer system 202 coupled to a display device 210 and a keyboard 212. Computer system 202 includes a processor 204, a memory 206, and a storage device 208. Memory 206 can include volatile memory (e.g., random access memory (RAM)), and can be used to store one or more memory pools. Storage device 208 can store at least, an OS, such as OS 132 illustrated in FIG. 1, and data.

Figure 3:
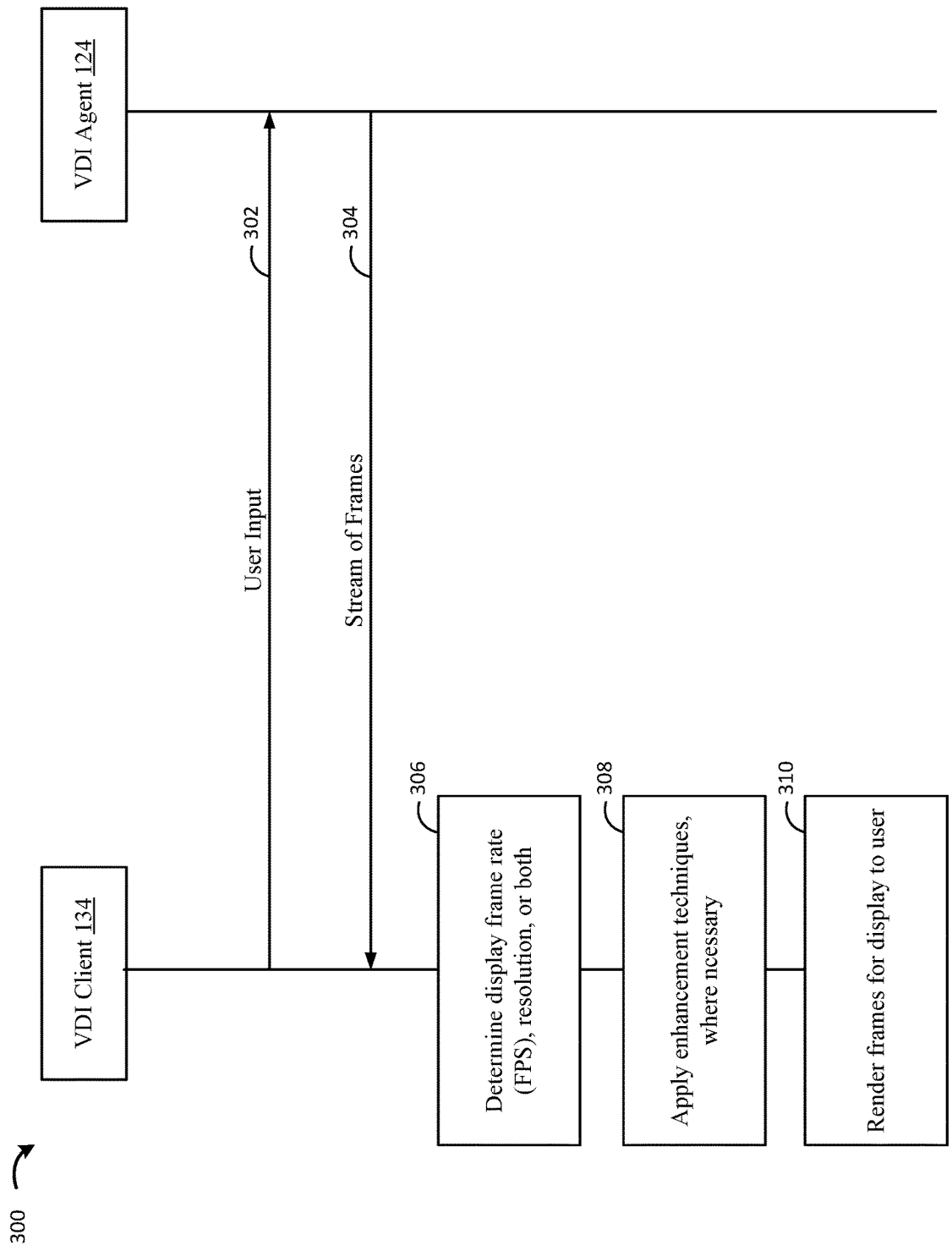
FIG. 3 is a call flow diagram illustrating example operations for applying enhancement techniques on a client device to improve user experience with a remoting application, according to an example embodiment of the present disclosure.

In certain aspects, memory 206 is configured to store instructions (e.g., computer-executable code) that when executed by processor 204, cause processor 204 to perform operations 300 illustrated in FIG. 3, or other operations for performing the various techniques discussed herein. In particular, FIG. 3 is a call flow diagram illustrating example operations 300 for applying display enhancement techniques on a client device to improve user experience with a remoting application, according to an example embodiment of the present disclosure.

As shown in FIG. 3, at 302, user input from a client device 104 is redirected to a remote desktop residing on a remote device, and more specifically, user input from VDI client 134 of client device 104 is redirected to VDI agent 124 of a VM (e.g., such as VM 120 illustrated in FIG. 1). For example, user input redirected by VDI client 134 to VDI agent 124 may include a mouse click, a mouse drag, a keyboard input through keyboard 212, for example, a touch-screen gesture, user interaction with a user interface (UI) element, and the like. At 304, in response to the user input received at VDI agent 124 at 302, VDI agent 124 may transmit, to VDI client 134, a stream of frames for display at client device 104. As an illustrative example, at 302 a user of client device 104 may use a mouse to control the playback of a movie by interacting with control buttons within display device 210, or by pressing keys on keyboard 212 that control the movie playback. When the user plays, fast-forwards, or rewinds the movie, such actions are transmitted to VDI agent 124 of the remote desktop. In response, VDI agent 124 generates and streams frames to refresh the movie frames presented within display device 210 for the client's viewing.

When client device 104 receives the stream of frame updates, remote display transformer 230 residing on client device 104 determines whether it is necessary to apply any user-experience enhancement techniques, such as frame interpolation and/or image upscaling techniques, and where necessary, further determines whether computing power at client device 104 is sufficient to carry out such user-experience enhancement techniques. For example, it may be possible to improve the user's experience without consuming additional resources at a host where the remote desktop, and VDI agent 124, are running by leveraging computing resources of OS 132 included in client device 104. Today, given the ever-increasing speed and processing power of client devices 104, such offloading of user-experience enhancement operations may be feasible.

In particular, at 306, VDI client 134, through remote display transformer 230, determines the display frame rate (FPS) and/or resolution of the frames received at 304. Remote Display transformer 230 compares the determined FPS and/or resolution of the frames received at 304 with expected FPS and/or expected resolution values previously set by a user of client device 104, and stored in settings module 222. Specifically, in some cases, a user may set an expected FPS and/or expected resolution for display of images at display device 210 through a UI provided at client device 104, and such expected FPS and/or expected resolution values may be stored in settings module 222. The UI provided at client device 104 for setting and/or adjusting expected FPS and/or resolution values for display of images at client device 104 may be described in more detail below with respect to FIG. 4.

Based on the comparison, remote display transformer 230 determines whether user-experience enhancement techniques are necessary prior to rendering the stream of frames for display a use of client device 104. In some cases, where the FPS and/or resolution of the frames received at 304 is greater than the expected FPS and/or expected resolution values previously set by a user of client device 104, VDI client 134, through remote display transformer 230, determines no enhancement techniques are necessary and thus skips application of such enhancement techniques at 308.

In some cases, however, where the FPS and/or resolution of the frames received at 304 is less than the expected FPS and/or expected resolution values previously set by a user of client device 104, VDI client 134, through remote display transformer 230, determines enhancement techniques are necessary to improve user experience at client device 104. For example, where the expected resolution is set by a user of client device 104 (e.g., a laptop) to be 1920×1080 pixels, and the received resolution of the frames is 640×480 pixels (e.g., producing a low quality image at client device 104), VDI client 134, through remote display transformer 230, may determine that, at least, image upscaling techniques are necessary for resolution enhancement prior to display of the frames to the user of client device 104.

In certain embodiments, where VDI client 134, through remote display transformer 230, determines one or more enhancement techniques are necessary, prior to application of such enhancement techniques, remote display transformer 230 calls network bandwidth monitor 224 (e.g., using an application programming interface (API) call) to ascertain whether the low FPS and/or resolution of the received frames is due, at least in part, to poor network conditions. Network bandwidth monitoring focuses on the available capacity of network resources and the amount of that capacity that is occupied by traffic. In particular, network bandwidth monitor 224 is configured to regularly test and/or estimate the network bandwidth between VDI client 134 at client device 104 and VDI agent 124 at the remote desktop. Network bandwidth monitor 224 may help to determine whether the root cause of a lower than expected FPS and/or resolution of frames received at VDI client 134 is a direct result of limited bandwidth availability.

In certain aspects, where VDI client 134, through remote display transformer 230, concludes the lower display quality at client device 104 is caused by poor network bandwidth, VDI client 134, through remote display transformer 230, may request VDI agent 124 to lower the FPS and/or resolution to the FPS and/or resolution of the frames received at VDI client 134 to save hardware consumption at VDI agent 124 during the poor network conditions. Alternatively, where VDI client 134, through remote display transformer 230, concludes the network is stable, no such request may be transmitted to VDI agent 124.

In certain embodiments, VDI client 134, through remote display transformer 230, checks whether CPU usage captured at CPU usage monitor 226 and/or GPU usage captured at GPU usage monitor 228 is lower than CPU usage threshold and/or GPU usage threshold values set by a user through a UI provided at client device 104. The UI provided at client device 104 for setting and/or adjusting CPU usage threshold and/or GPU usage threshold values may be described in more detail below with respect to FIG. 4.

In some cases, VDI client 134, through remote display transformer 230, performs this check subsequent to requesting VDI agent 124 reduce the FPS and/or resolution. In some cases, VDI client 134, through remote display transformer 230, performs this check subsequent to determining the network is stable and further determining the FPS and/or resolution at the remote desktop does not need to be reduced. In some cases, VDI client 134, through remote display transformer 230, performs this check without determining a current state of the network (e.g., network bandwidth).

CPU monitoring may help to analyze spikes in CPU load and identify overactive CPU usage, along with hardware-based monitoring features, at client device 104. More specifically, CPU usage monitor 226 is configured to monitor the CPU usage on client device 104 to ensure CPU usage at client device 104 does not exceed the CPU usage threshold value set at a UI of client device 104. If the local CPU usage exceeds the CPU usage threshold, CPU usage monitor 226 is configured to request remote display transformer 230 decrease CPU usage until the usage is lower than the CPU usage threshold. Similarly, GPU usage monitor 228 plays a comparable role to CPU usage monitor with respect to GPU, to make sure GPU usage at client device 104 does not exceed a GPU usage threshold value set at a UI of client device 104. If the local GPU usage exceeds the GPU usage threshold, GPU usage monitor 228 is configured to request remote display transformer 230 decrease GPU usage until the usage is lower than the GPU usage threshold. For example, where CPU usage monitor 226 requests that display transformer 230 decrease CPU usage and/or GPU usage monitor 228 requests that remote display transformer 230, remote display transformer 230 may decrease enhancement techniques (e.g., frame interpolation and/or image upscaling techniques) being applied to frames received from VDI agent 124 in accordance with the request(s).

Where VDI client 134, through remote display transformer 230, concludes the compute power is sufficient (e.g., CPU and/or GPU usage at client device 104 is less than CPU usage threshold and/or GPU usage threshold values, respectively), and where remote display transformer 230 has previously determined one or more enhancement techniques are necessary (e.g., based, at least in part, on lower than expected FPS and/or resolution of frames received at VDI client 134), at block 308, such enhancement techniques are applied. As mentioned previously, enhancement techniques may include, at least, frame interpolation and/or image upscaling techniques to improve the display of images at client device 104.

Frame interpolation techniques may use MEMC. In particular, motion estimation (ME) is the process of determining motion vectors that describe the transformation from one two dimensional (2D) image to another; usually from adjacent frames in the stream of frames provided to VDI client 134. ME may examine the movement of objects in the sequences of frames to attempt to obtain the vectors representing the estimated motion. On the other hand, motion compensation (MC) uses the knowledge of object motion obtained during ME to achieve data compression. As such, MEMC is a technique used to eliminate the temporal redundancy due to high correlation between consecutive frames. A number of existing artificial intelligence (AI) frame interpolation technologies may be used to incorporate such MEMC techniques for enhancing display at client device 104. Examples of such technologies that may be used include video enhancement with Task-Oriented Flow (TO-Flow), depth-aware video frame interpolation (DAIN), SmoothVideo Project (SVP), and the like.

Such AI frame interpolation technologies may be used in the VDI environment to generate intermediate frames between frames received at VDI client 134 by means of interpolation, in an attempt to increase the display frame rate. For example, a model may be trained based on the VDI environment, and the trained model may be deployed for use by remote display transformer 230 at client device 104. The trained model may be stored in frame interpolation libraries 232 at client device 104.

The model may be trained using supervised learning, which maps an input to an output based on example input-output pairs. More specifically, screen movement at client device 104 may be recorded and used as input (e.g., training data) for training a model to perform frame interpolation in the VDI environment. Screen movement recorded at client device 104 may include movement, captured as frame sequences, due to a user of client device 104 opening a document, closing a document, mouse movement by the user on an open window, etc. According to certain aspects, to train the model, a first captured frame and a third captured frame (e.g., in the frame sequence) may be used as input into the machine learning model to generate an intermediate frame between the first and third frame as output. The generated output by the model may be compared to a second captured frame in the frame sequence. The model may compute a loss based on the difference between the generated output, e.g., the generated intermediate frame, and the second frame in the frame sequence. This loss can then be used to modify the internal parameters or weights of the model. By iteratively processing each frame set corresponding to three frames in sequential order in the frame sequences, the model may be iteratively refined to generate accurate predictions of intermediate frames for display at client device 104.

The trained model is deployed for use by remote display transformer 230 during runtime. For example, where remote display transformer 230 determines compute power at client device 104 is sufficient to perform enhancement techniques, remote display transformer uses the received stream of frames as input in the trained model to predict intermediate frames, thereby increasing the display frame rate to improve display at client device 104.

In addition, or alterative, to frame interpolation techniques, in some cases, remote display transformer 230 may use image upscaling models stored in image upscaling libraries 234 at client device 104. As mentioned previously, image upscaling techniques, also referred to as resolution enhancement techniques, may be used to generate high resolution frames based on received low resolution frames received from VDI agent 124 at the remote desktop.

Similar to training models for frame interpolation, such models for image upscaling may also be trained using screen movement at client device 104. In particular, screen movement at client device 104 may be recorded and used as input (e.g., training data) for training a model to perform image upscaling in the VDI environment. The trained model may be deployed for use by remote display transformer 230 during runtime. For example, where remote display transformer 230 determines compute power at client device 104 is sufficient to perform enhancement techniques, remote display transformer uses the received stream of frames as input in the trained model to predict higher resolution frames for display at client device 104 for viewing by a user of client device 104. Examples of such image upscaling technologies that may be used for image upscaling at client device 104 include anti-aliasing techniques, deep learning super sampling (DLSS) on NVIDIA, FidelityFX of Advanced Micro Devices, Inc. (AMD), and the like.

At 310, after applying frame interpolation and/or image upscaling (or applying neither where computing power at client device 104 is insufficient to carry out such tasks), VDI client 134 renders the enhanced frames (or originally received frames where no enhancement techniques are applied) for display to a user of client device 104.

The aforementioned process may be carried out continuously as long as VDI client 134 continues to receive frames from VDI agent 124. For example, VDI client 134, through remote display transformer 230, may continuously assess aspects (e.g., FPS, resolution, or both) of frames received from VDI agent 124, network quality, and computing power at client device 104 for purposes of improving display quality at client device 104. The aforementioned process may be described in more detail with respect to workflow 500 of FIGS. 5A and 5B.

FIG. 4 depicts an example UI 400 for configuring frame interpolation and resolution upscaling on client device 104, according to an example embodiment of the present disclosure. Example UI 400 provides a point of interaction between a user of client device 104 and client device 104 itself. In particular, a user of client device 104 uses example UI 400 to set expected frame rate, expected resolution, a CPU usage threshold, and/or a GPU usage threshold. Such values set by the user of client device 104, however, remain within limitations configured for client device 104. For example, where a display of client device 104 is configured with a maximum display resolution capability of 1920×1080 pixels, a user of client device 104 may only select expected resolution values below or equal to this pixel amount. Accordingly, a user of client device 104 may use example UI 400 to increase and/or decrease display frame rate and/or display resolution to manipulate display quality of images on client device 104.

For example, an FPS value entered in example UI 400 may be used as a trigger for remote display transformer to determine whether frame interpolation techniques are necessary. For example, where the FPS of the received stream of frames (e.g., such as the stream of frames received by VDI client 134 at 304 in FIG. 3) is less than the expected FPS entered into example UI 400, remote display transformer 230 may be triggered to perform frame interpolation (e.g., where local computing resources are sufficient). Further, the target frame rate may be used by remote display transformer 230 to determine a number of frames to generate from the received stream of frames (e.g., such as the stream of frames received by VDI client 134 at 304 in FIG. 3). In particular, remote display transformer may generate and insert frames into the original sequence of frames received from VDI agent 124 until the expected FPS (e.g., entered into example UI 400) is met.

Similarly, a resolution value (e.g., width×height) entered in example UI 400 may be used as a trigger for remote display transformer 230 to determine whether image upscaling (e.g., resolution enhancement) techniques are necessary. For example, where the resolution of the received stream of frames (e.g., such as the stream of frames received by VDI client 134 at 304 in FIG. 3) is less than the expected resolution entered into example UI 400, remote display transformer 230 may be triggered to perform image upscaling (e.g., where local computing resources are sufficient). Further, the expected resolution may be used by remote display transformer 230 to determine what resolution of frames are to be generated from the lower resolution frames received from VDI agent 124. In particular, remote display transformer 230 may upscale the resolution of the remote display at client device 104 until the expected resolution (e.g., entered into example UI 400) is met.

The CPU usage threshold and the GPU usage threshold entered in example UI 400 may be used by remote display transformer 230 to determine whether client device 104 is capable of performing enhancement techniques on frames received from VDI agent 124. In the illustrative example, the CPU usage threshold and the GPU usage threshold may be entered as a percentage of total CPU and GPU, respectively, allocated to client device 104. For example, in cases where the actual CPU and/or actual GPU usage at client device 104 is less than the CPU usage threshold and/or GPU usage threshold entered into example UI 400, remote display transformer 230 determines frame interpolation techniques and/or image upscaling techniques can be applied, such as if the FPS and/or resolution of frames received from VDI agent 124 is below the expected FPS and/or resolution. However, the opposite is true in cases where the actual CPU and/or actual GPU usage at client device 104 is more than the CPU usage threshold and/or GPU usage threshold entered into example UI 400, indicating client device 104 does not have enough resources to perform such enhancement techniques given other workloads executing on client device 104, despite the fact that FPS and/or resolution of frames received from VDI agent 124 may be below the expected FPS and/or resolution.

In some cases where UI 400 for configuring frame interpolation and resolution upscaling on client device 104 is enabled on client device 104, default values for expected FPS, resolution, CPU usage threshold, and GPU usage threshold may be assigned where a user of client device 104 does not enter such values. Accordingly, default values entered into UI 400 may be used by remote display transformer 230 to determine whether enhancement techniques are necessary and whether client device 104 is capable of performing such enhancement techniques to improve display quality of images for a user of client device 104.

Figure 5A:
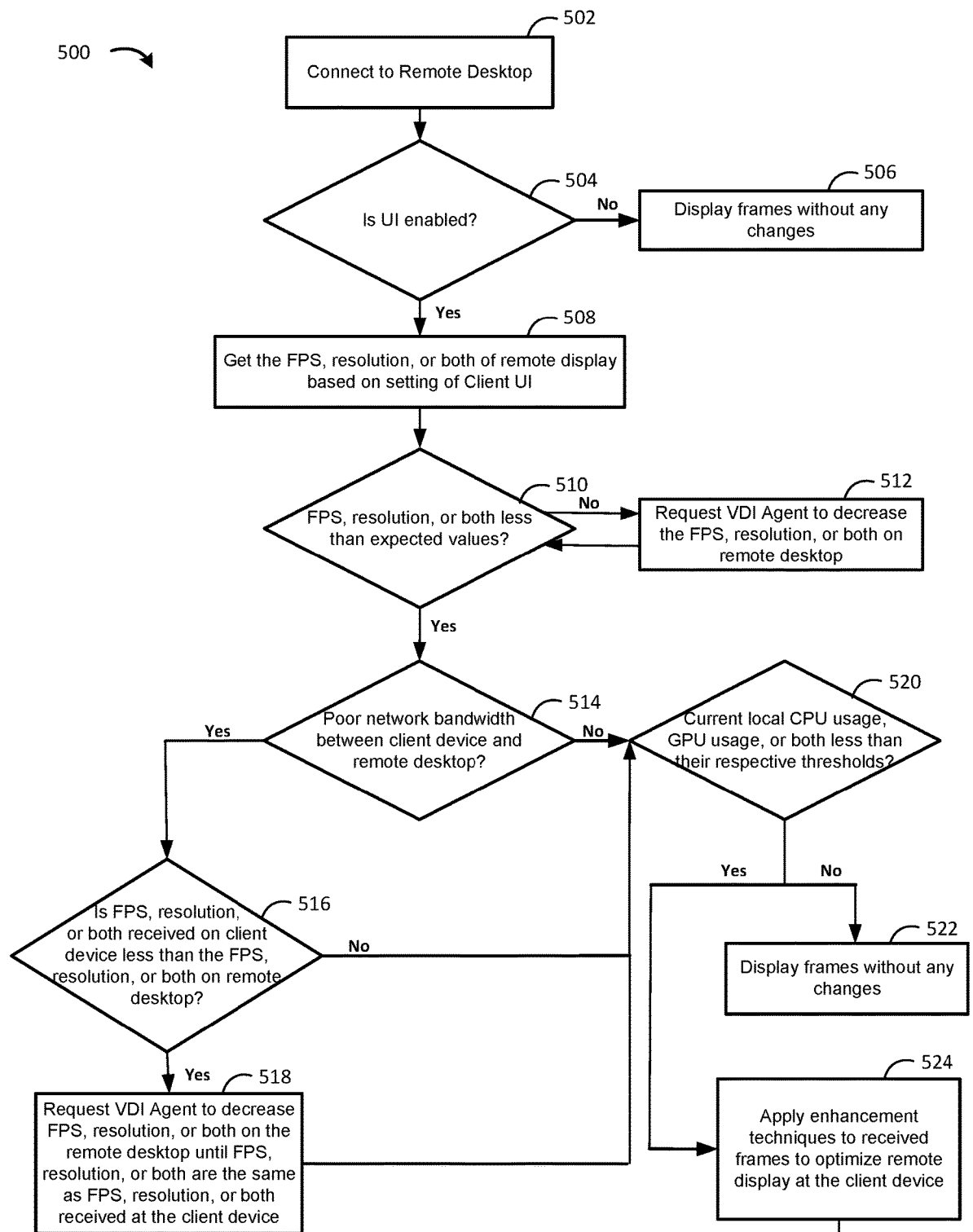
FIGS. 5A and 5B illustrate an example workflow for optimizing remote display at a client device in accordance with local computing capabilities at the client device, according to an example embodiment of the present application.
Figure 5B:
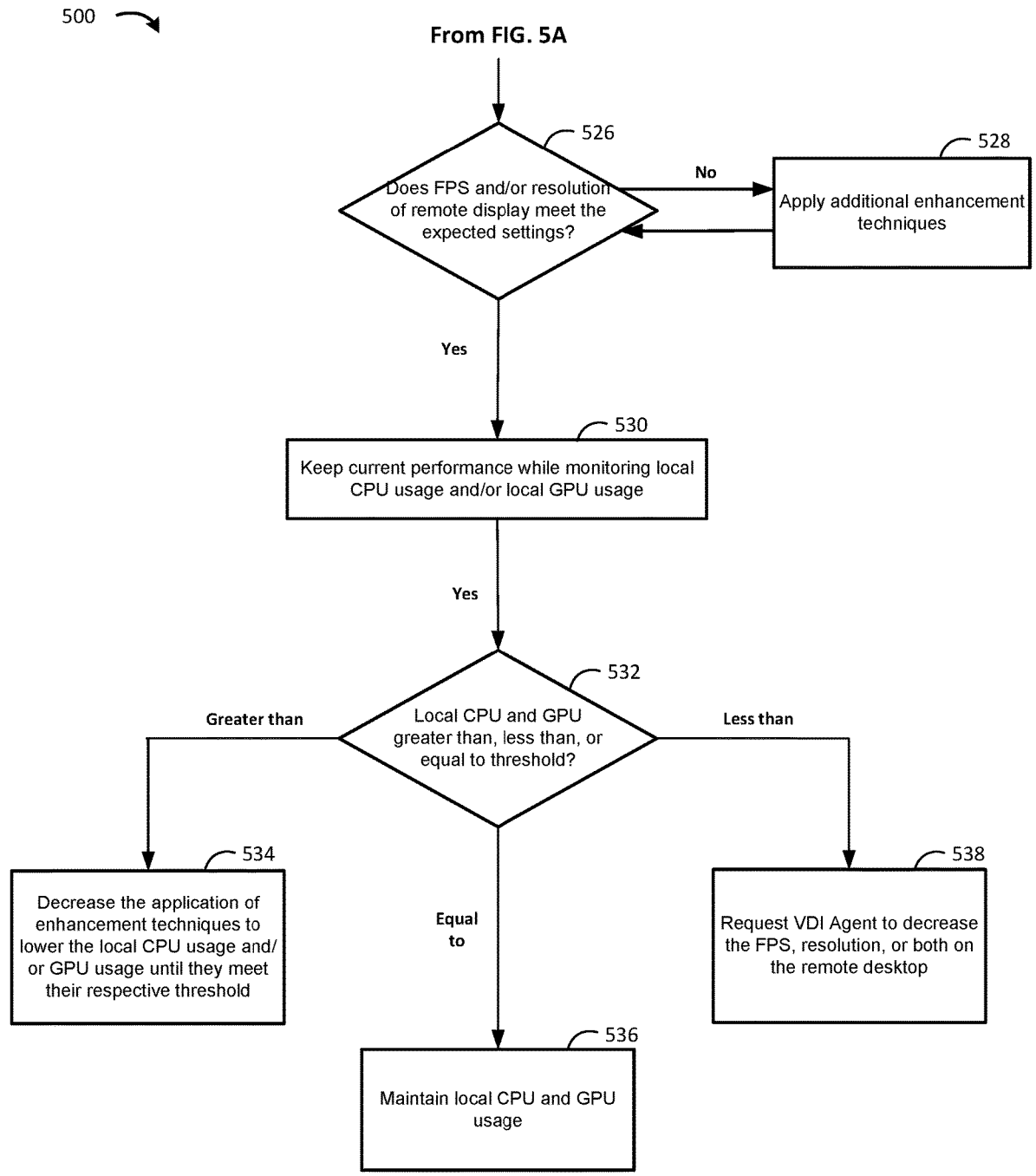

FIGS. 5A and 5B illustrate an example workflow 500 for optimizing remote display at a client device, such as client device 104, in accordance with local computing capabilities of the client device, according to an example embodiment of the present application. Workflow 500 may be used to determine whether application of one or more enhancement techniques, such as frame interpolation and/or image upscaling techniques, to frames received at client device 104 is necessary to improve remote display at client device 104, and where necessary, further determine whether computing power at client device 104 is sufficient to carry out such enhancement techniques. Workflow 500 of FIG. 5 may be performed, for example, by remote display transformer 230 of client device 104 illustrated in FIG. 2.

Workflow 500 may begin, at operation 502, by client device 104 connecting to a remote desktop running on a VM in a remote data center, such as VM 120 running on host 102 in data center 101 illustrated in FIG. 1. After connection, frames of the remote desktop are transmitted to a VDI client of client device 104, such as VDI client 134 illustrated in FIG. 1, using a remote display protocol.

After receiving one or more frames from the remote desktop, remote display transformer 230 of client device 104 determines whether one or more enhancement techniques, such as frame interpolation and/or image upscaling techniques, are enabled at client device 104. As an example, the one or more enhancement techniques may be enabled/disable using a UI, such as example UI 400 illustrated in FIG. 4. Where enhancement techniques are not enabled, at operation 506, remote display transformer 230 determines to display frames received from the remote desktop without any additional enhancements applied.

However, where one or more enhancement techniques are enabled on client device 104, at operation 508, remote display transformer 230 determines the expected frame rate and/or the expected resolution, such as configured at the UI by a user of client device 104. Accordingly, at operation 510, remote display transformer 230 determines whether the FPS of frames received from the remote desktop is less than the expected FPS and/or whether the resolution of frames received from the remote desktop is less than the expected resolution. Remote display transformer 230 may make such a determination to ascertain whether enhancement techniques are to be applied to improve remote display of the frames at client device 104.

Where the FPS and/or resolution of frames received from the remote desktop is not less than the expected FPS and/or resolution, at operation 512, remote display transformer 230 may request a VDI agent of the remote desktop, such as VDI agent 124 of the remote desktop illustrated in FIG. 1, to reduce the FPS and/or resolution of frames being transmitted to client device 104. In other words, remote display transformer requests VDI agent 124 to reduce an amount of resources being allocated to client device 104 for the generation of one or more frames. This may help to reduce the overall resource consumption on data center 101, thereby freeing up resources for use, e.g., by other client devices connected to the remote desktop. Accordingly, in some cases, VDI agent 124 may reduce the FPS and/or resolution such that, at operation 510, remote display transformer 230 determines the FPS and/or resolution of frames received from the remote desktop is less than the expected FPS and/or resolution.

Where the FPS of frames received from the remote desktop is less than the expected FPS and/or the resolution of frames received from the remote desktop is less than the expected resolution, at operation 514, remote display transformer 230 determines whether the lower display quality (e.g., the lower than expected FPS and/or resolution of frames received from the remote desktop) is due to poor network bandwidth between client device 104 and the remote desktop. Remote display transformer 230 may make such a determination by calling (e.g., through an API call) a network bandwidth monitor, such as network bandwidth monitor 224 illustrated in FIG. 2. As mentioned previously, network bandwidth monitor 224 is configured to regularly test and/or estimate the network bandwidth between VDI client 134 at client device 104 and VDI agent 124 at the remote desktop.

Where, at operation 514, remote display transformer 230 ascertains the lower display quality is due to poor network bandwidth between client device 104 and the remote desktop, at operation 516, remote display transformer 230 determines whether the FPS and/or resolution of frames received at client device 104, from the remote desktop, is less than the FPS of frames captured by VDI agent 124 and/or the resolution of frames captured by VDI agent 124 prior to transmittal to client device 104. In particular, in the VDI environment, VDI agent 124 captures frames generated at the remote desktop and sends such frames to client device 104 for display at client device 104. However, where the network bandwidth is poor, VDI agent 124 may not transmit all frames generated at the remote desktop. In other words, an FPS (and/or resolution) of frames generated at remote desktop may be greater than an FPS (and/or resolution) of frames transmitted to client device 104.

Where remote display transformer 230 determines the FPS and/or resolution of frames received at client device 104, from VDI agent 124, is less than the FPS and/or resolution of frames captured by VDI agent 124 prior to transmittal to client device 104, at operation 518, remote display transformer 230 requests VDI agent 124 to decrease the FPS and/or resolution on the remote desktop until the FPS and/or resolution at the remote desktop is the same as the FPS and/or resolution of frames received at client device 104. Again, reduction of the FPS and/or resolution at the remote desktop may reduce an amount of resources being allocated to client device 104 for the generation of one or more frames to help reduce the overall resource consumption on data center 101. This may also help to improve the network to allow for improvement of the frame rate.

On the other hand, where, at operation 516, remote display transformer 230 determines the FPS and/or resolution of frames received at client device 104, from VDI agent 124, is not less than (e.g., is greater than or equal to) the FPS and/or resolution of frames captured by VDI agent 124 prior to transmittal to client device 104, at operation 520, remote display transformer 230 determines whether the current local CPU usage is less than a CPU usage threshold set for client device 104 and/or whether the current local GPU usage is less than a GPU usage threshold set for client device 104. Remote display transformer 230 may also make this determination where, at operation 514, remote display transformer determines the network is stable (e.g., not experiencing poor network bandwidth). In this case, remote display transformer 230 checks whether CPU usage captured at a CPU usage monitor, such as CPU usage monitor 226 illustrated in FIG. 2, and/or GPU usage captured at a GPU usage monitor, such as GPU usage monitor 228 illustrated in FIG. 2, is lower than a CPU usage threshold and/or a GPU usage threshold.

Where remote display transformer 230 concludes the current local CPU usage and/or the current local GPU usage is greater than or equal to the CPU usage threshold and/or the GPU usage threshold, respectively, set for client device 104, remote display transformer 230 displays the frames received at client device 104 without any additional enhancements applied. In particular, where resources at client device 104 are insufficient to apply frame interpolation and/or image upscaling techniques, such techniques may not be applied.

However, where remote display transformer 230 concludes the compute power at client device 104 is sufficient (e.g., CPU and/or GPU usage at client device 104 is less than CPU usage threshold and/or GPU usage threshold values, respectively), at operation 524, remote display transformer 230 applies enhancement techniques, such as frame interpolation and/or image upscaling techniques described herein, to frames received from the remote desktop to optimize the remote display of such frames at client device 104. As mentioned previously, remote display transformer 230 may use a trained frame interpolation model and/or a trained image upscaling model stored in one or more libraries at client device 104, such as frame interpolation libraries 232 and/or image upscaling libraries 234 illustrated in FIG. 2. Remote display transformer 230 may use such models to increase the FPS and/or resolution of frames for display at client device 104 to expected FPS and/or resolution values, while also regularly communicating with CPU usage monitor 226 and/or GPU usage monitor 228 to ensure local CPU usage and/or GPU usage does not exceed threshold CPU usage and/or GPU usage threshold values previously set for client device 104.

Accordingly, after applying such enhancement techniques, at operation 526 shown in FIG. 5B, remote display transformer 230 determines whether the FPS and/or resolution of the optimized remote display (e.g., the frames with enhancement techniques applied) achieve (e.g., are equal to or greater than) the expected FPS and/or resolution.

Where the FPS of the optimized frames and/or the resolution of the optimized frames is less than the expected FPS and/or resolution, respectively, at operation 528, remote display transformer 230 continues to apply frame interpolation and/or image upscaling techniques until the expected FPS and/or expected resolution is met. In conjunction with applying additional enhancement techniques, remote display transformer 230 monitors local CPU usage and/or GPU usage to ensure local GPU and/or GPU capabilities (e.g., thresholds) of client device 104 are not exceeded.

Where, at operation 526, the FPS of the optimized frames and/or the resolution of the optimized frames achieves (e.g., is equal to or greater than) the expected FPS and/or the expected resolution, respectively, (e.g., due to initial enhancement techniques applied at operation 524 and/or additional enhancement techniques applied at operation 528), at operation 530, remote display transformer 230 determines to continue applying current enhancement techniques to received frames while also monitoring local CPU usage and/or local GPU usage at client device 104.

More specifically, at operation 532, remote display transformer 230 determines whether current CPU usage and/or GPU usage at client device 104, while applying current enhancement techniques to received frames from VDI agent 124 of the remote desktop, continues to be below CPU usage threshold and/or GPU usage threshold values. In some cases, where the local CPU usage and/or GPU usage is greater than CPU usage threshold and/or GPU usage threshold values, respectively, at operation 534, remote display transformer will decrease the application of enhancement techniques to frames received at client device 104 to lower the local CPU usage and/or GPU usage until such GPU and/or GPU usage meet their respective thresholds.

In some cases, where the local CPU usage and/or GPU usage is equal to CPU usage threshold and/or GPU usage threshold values, respectively, at operation 536, remote display transformer will make no further changes and continue applying the previously determined enhancement techniques to frames received at client device 104. However, remote display transformer 230 will continuously monitor GPU and/or GPU usage at client device 104 to ensure enhancement technique workloads are not requiring additional compute power over the defined CPU and/or GPU usage thresholds.

In some cases, where the local CPU usage and/or GPU usage is less than CPU usage threshold and/or GPU usage threshold values, respectively, at operation 538, remote display transformer will request VDI agent 124 to decrease the FPS and/or resolution of graphical data sent to VDI client 134 so that remote display transformer 230 will use more local CPU capability and/or local GPU capability to optimize remote display locally. As a result, hardware consumption on the remote desktop may be reduced.

Accordingly, techniques presented herein may utilize computing capabilities on client device 104 to reduce hardware consumption at a remote desktop while also monitoring local CPU usage and/or GPU usage at client device 104 to ensure computing capabilities at client device 104 are not exceeded when optimizing remote display for a user of client device 104.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of optimizing remote display at a client device in communication with a remote desktop, the method comprising:
receiving one or more frames for display at the client device, the one or more frames corresponding to the remote desktop running on a remote device;
determining that at least one of a frame rate of the received one or more frames is less than an expected frame rate or a resolution of the received one or more frames is less than an expected resolution;
determining that at least one of a local central processing unit (CPU) usage at the client device is less than a CPU usage threshold or a local graphics processing unit (GPU) usage at the client device is less than a GPU usage threshold;
using at least one of local CPU or local GPU at the client device to apply one or more enhancement techniques to the received one or more frames to produce one or more optimized frames while monitoring at least one of the local CPU usage or the local GPU usage at the client device to ensure that the local CPU usage and the local GPU usage do not exceed the CPU usage threshold or the GPU usage threshold, respectively; and
rendering the one or more optimized frames for display at the client device.

2. The method of claim 1, further comprising:
determining that at least one of the frame rate or the resolution of the received one or more frames is less than a frame rate or a resolution of frames generated for the client device at the remote desktop; and
requesting an agent of the remote desktop to reduce at least one of the frame rate or the resolution of frames generated for the client device at the remote desktop.

3. The method of claim 2, wherein at least one of the frame rate or the resolution of the received one or more frames is less than the frame rate or the resolution of frames generated for the client device at the remote desktop due, at least in part, to poor network conditions between the client device and the remote desktop.

4. The method of claim 1, further comprising:
determining that at least one of the frame rate or the resolution of the received one or more frames is more than the expected frame rate or the expected resolution configured for the client device; and
requesting an agent of the remote desktop reduce at least one of a frame rate or a resolution of frames generated for the client device at the remote desktop.

5. The method of claim 1, wherein at least one of the local CPU or the local GPU at the client device is used to apply the one or more enhancement techniques to the received one or more frames to produce the one or more optimized frames until at least one of:
a frame rate of the one or more optimized frames is equal to or greater than the expected frame rate, or
a resolution of the one or more optimized frames is equal to or greater than the expected resolution configured for the client device.

6. The method of claim 1, wherein the one or more enhancement techniques comprise one or more of:
frame interpolation techniques for predicting one or more interpolated frames from the received one or more frames to increase the frame rate of the received one or more frames; or
image upscaling techniques for predicting one or more high resolution frames from one or more low resolution frames of the received one or more frames to increase the resolution of the received one or more frames.

7. The method of claim 1, further comprising adjusting one or more of the expected frame rate or the expected resolution.

8. A system comprising one or more processors and a non-transitory computer readable medium comprising instructions that, when executed by the one or more processors, cause the system to perform a method of optimizing remote display at a client device in communication with a remote desktop, the method comprising:
receiving one or more frames for display at the client device, the one or more frames corresponding to the remote desktop running on a remote device;
determining that at least one of a frame rate of the received one or more frames is less than an expected frame rate or a resolution of the received one or more frames is less than an expected resolution;

determining that at least one of a local central processing unit (CPU) usage at the client device is less than a CPU usage threshold or a local graphics processing unit (GPU) usage at the client device is less than a GPU usage threshold;

using at least one of local CPU or local GPU at the client device to apply one or more enhancement techniques to the received one or more frames to produce one or more optimized frames while monitoring at least one of the local CPU usage or the local GPU usage at the client device to ensure that the local CPU usage and the local GPU usage do not exceed the CPU usage threshold or the GPU usage threshold, respectively; and rendering the one or more optimized frames for display at the client device.

9. The system of claim 8, wherein the method further comprises:

determining that at least one of the frame rate or the resolution of the received one or more frames is less than a frame rate or a resolution of frames generated for the client device at the remote desktop; and requesting an agent of the remote desktop to reduce at least one of the frame rate or the resolution of frames generated for the client device at the remote desktop.

10. The system of claim 9, wherein at least one of the frame rate or the resolution of the received one or more frames is less than the frame rate or the resolution of frames generated for the client device at the remote desktop due, at least in part, to poor network conditions between the client device and the remote desktop.

11. The system of claim 8, wherein the method further comprises:

determining that at least one of the frame rate or the resolution of the received one or more frames is more than the expected frame rate or the expected resolution configured for the client device; and requesting an agent of the remote desktop reduce at least one of a frame rate or a resolution of frames generated for the client device at the remote desktop.

12. The system of claim 8, wherein at least one of the local CPU or the local GPU at the client device is used to apply the one or more enhancement techniques to the received one or more frames to produce the one or more optimized frames until at least one of:

a frame rate of the one or more optimized frames is equal to or greater than the expected frame rate, or a resolution of the one or more optimized frames is equal to or greater than the expected resolution configured for the client device.

13. The system of claim 8, wherein the one or more enhancement techniques comprise one or more of:

frame interpolation techniques for predicting one or more interpolated frames from the received one or more frames to increase the frame rate of the received one or more frames; or image upscaling techniques for predicting one or more high resolution frames from one or more low resolution frames of the received one or more frames to increase the resolution of the received one or more frames.

14. The system of claim 8, wherein the method further comprises adjusting one or more of the expected frame rate or the expected resolution.

15. A non-transitory computer-readable medium comprising instructions that, when executed by one or more processors of a computing system, cause the computing system to perform a method of optimizing remote display at a client device in communication with a remote desktop, the method comprising:

receiving one or more frames for display at the client device, the one or more frames corresponding to the remote desktop running on a remote device;

determining that at least one of a frame rate of the received one or more frames is less than an expected frame rate or a resolution of the received one or more frames is less than an expected resolution;

determining that at least one of a local central processing unit (CPU) usage at the client device is less than a CPU usage threshold or a local graphics processing unit (GPU) usage at the client device is less than a GPU usage threshold;

using at least one of local CPU or local GPU at the client device to apply one or more enhancement techniques to the received one or more frames to produce one or more optimized frames while monitoring at least one of the local CPU usage or the local GPU usage at the client device to ensure that the local CPU usage and the local GPU usage do not exceed the CPU usage threshold or the GPU usage threshold, respectively; and rendering the one or more optimized frames for display at the client device.

16. The non-transitory computer-readable medium of claim 15, wherein the method further comprises:

determining that at least one of the frame rate or the resolution of the received one or more frames is less than a frame rate or a resolution of frames generated for the client device at the remote desktop; and requesting an agent of the remote desktop to reduce at least one of the frame rate or the resolution of frames generated for the client device at the remote desktop.

17. The non-transitory computer-readable medium of claim 16, wherein at least one of the frame rate or the resolution of the received one or more frames is less than the frame rate or the resolution of frames generated for the client device at the remote desktop due, at least in part, to poor network conditions between the client device and the remote desktop.

18. The non-transitory computer-readable medium of claim 15, wherein the method further comprises:

determining that at least one of the frame rate or the resolution of the received one or more frames is more than the expected frame rate or the expected resolution configured for the client device; and requesting an agent of the remote desktop reduce at least one of a frame rate or a resolution of frames generated for the client device at the remote desktop.

19. The non-transitory computer-readable medium of claim 15, wherein at least one of the local CPU or the local GPU at the client device is used to apply the one or more enhancement techniques to the received one or more frames to produce the one or more optimized frames until at least one of:

a frame rate of the one or more optimized frames is equal to or greater than the expected frame rate, or a resolution of the one or more optimized frames is equal to or greater than the expected resolution configured for the client device.

20. The non-transitory computer-readable medium of claim 15, wherein the one or more enhancement techniques comprise one or more of:

frame interpolation techniques for predicting one or more interpolated frames from the received one or more frames to increase the frame rate of the received one or more frames; or image upscaling techniques for predicting one or more high resolution frames from one or more low resolution frames of the received one or more frames to increase the resolution of the received one or more frames.

\* \* \* \* \*